J. W. W. SMITH.
Car Brake.
No. 87,214.
Patented Feb. 23, 1869.
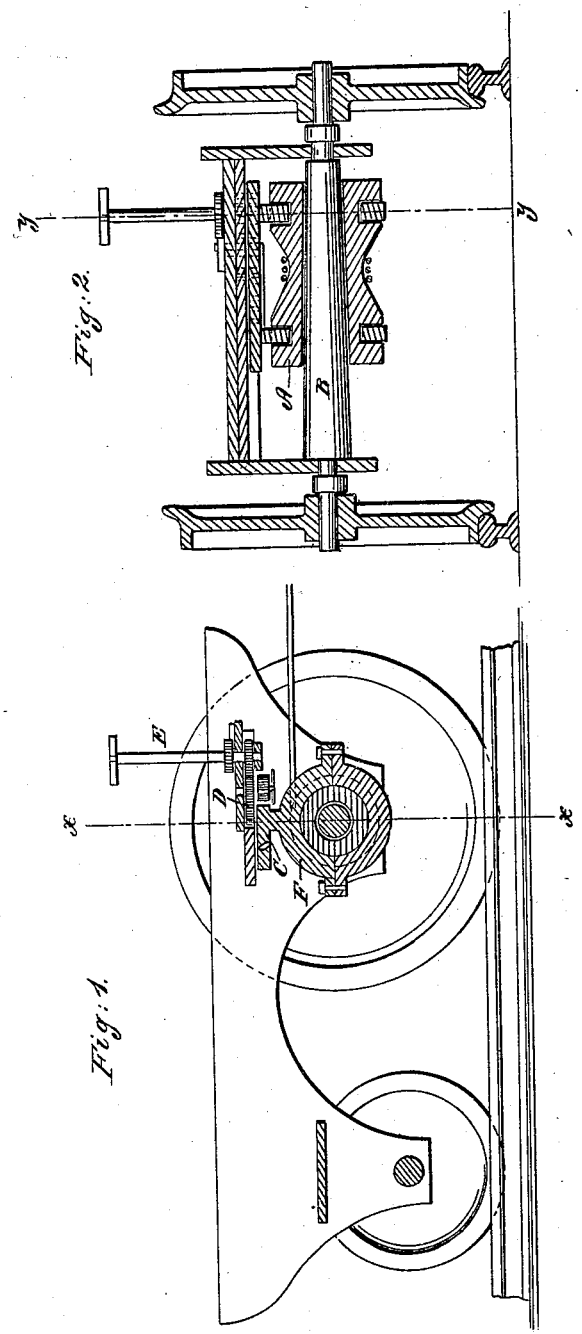

J. W. W. SMITH, OF CANTON, MISSOURI.

Letters Patent No. 87,214, dated February 23, 1869.

IMPROVED CAR-BRAKE.

The Schedule referred to in these Letters Patent and making part of the same.

*To all whom it may concern:*

Be it known that I, J. W. W. SMITH, of Canton, in the county of Lewis, and State of Missouri, have invented a new and useful Improvement in Car-Brakes; and I do hereby declare that the following is a full, clear, and exact description thereof, which will enable others skilled in the art to make and use the same, reference being had to the accompanying drawings, forming part of this specification.

This invention relates to improvements in car-brakes, whereby it is designed, by the employment of a cylinder, having a tapered hole through it longitudinally, and fitted to an axle having a corresponding taper, to provide a simple and effective brake, the said cylinder being provided with means for sliding on the said tapered shaft, so as to cause it to adhere by the frictional contact therewith, and rotate with it, thereby winding up cords or chains attached to the brakes, or to free it from the said frictional contact.

In the accompanying drawings—

Figure 1 represents a longitudinal sectional elevation of a car with my improved brake attached, and Figure 2 represents a transverse section of the same.

Similar letters of reference indicate like parts.

A represents a cylinder, having a tapered axial bore, to fit the correspondingly-tapered axle B.

C represents a slide, arranged in a transverse groove in the bottom of the car, and provided with teeth, by which it is moved to and fro in the said groove, by a system of gear-wheels, D, operated from a brake-shaft, E, rising up from the floor of the car in the usual manner.

Projecting downward from the slide C, and taking into annular grooves in the said cylinder, are arms F, fitted to work in the said grooves, by which the cylinder is moved with the slide, one way or the other, on the shaft.

Chains or ropes may be attached to the cylinder and to the brakes, which may be of ordinary or any preferred construction.

When it is desired to bring them into action, the cylinder may be moved on the shaft, toward the largest end, until the frictional contact of the two is such as to cause the cylinder to move with the shaft with sufficient force to actuate them, and they may be thrown out of action by moving the cylinder in the opposite direction.

I do not desire to limit myself to the arrangement of means herein shown for moving the said cylinder, as various obvious plans may be adopted to accomplish the same.

Having thus described my invention,

I claim as new, and desire to secure by Letters Patent—

1. The combination, with a tapered axle, of a cylinder, arranged thereon, and combined with the brakes and with a means for sliding the cylinder, substantially as and for the purpose described.

2. The combination, with the cylinder A, of the slide C, provided with the arms F, taking into the grooves of the same, and with the system of gearing for sliding it, substantially as and for the purpose described.

J. W. W. SMITH.

Witnesses:
L. C. BEVANS,
W. A. McKIM.